A. T. NOGRADY.
DIFFERENTIAL GEARING.
APPLICATION FILED JAN. 31, 1919.
1,404,791.
Patented Jan. 31, 1922.
3 SHEETS—SHEET 1.
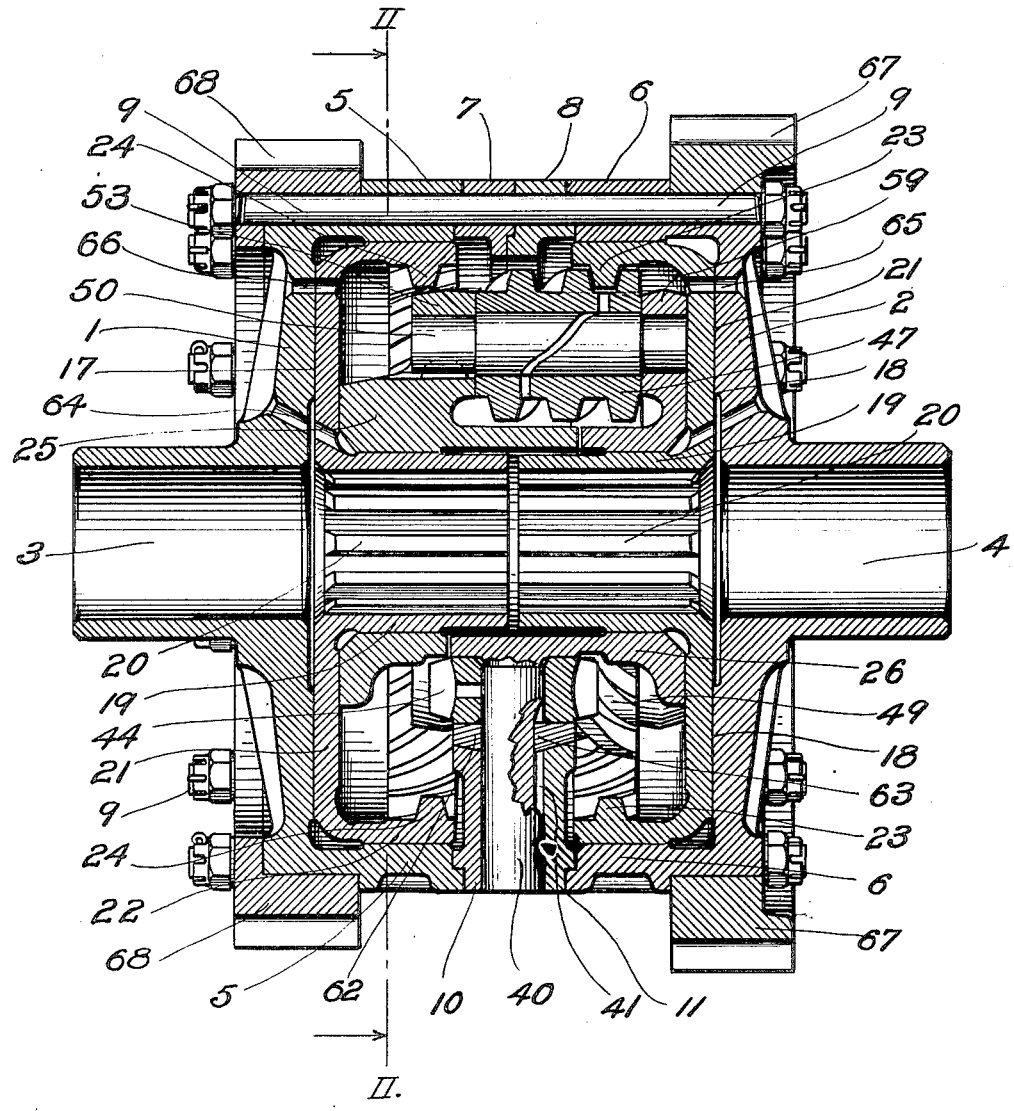
INVENTOR
AnDor T. Nogrady.
BY Arthur C. Brown
ATTORNEY

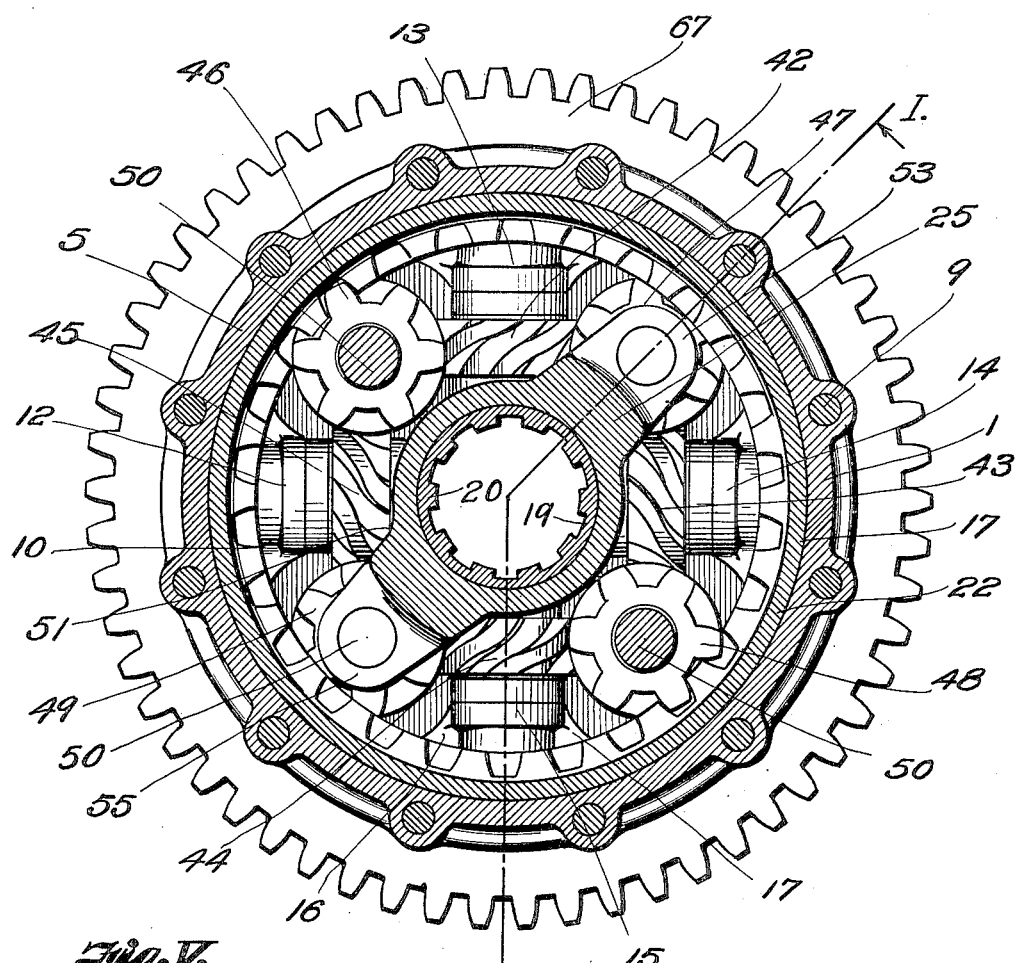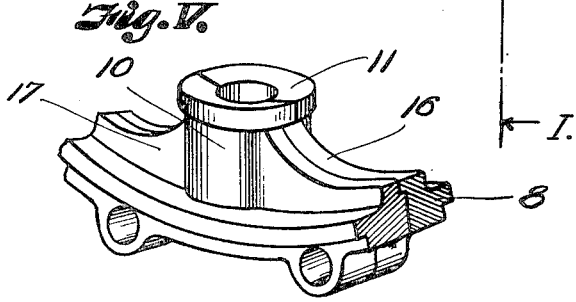

A. T. NOGRADY.
DIFFERENTIAL GEARING.
APPLICATION FILED JAN. 31, 1919.
1,404,791.
Patented Jan. 31, 1922.
3 SHEETS—SHEET 3.
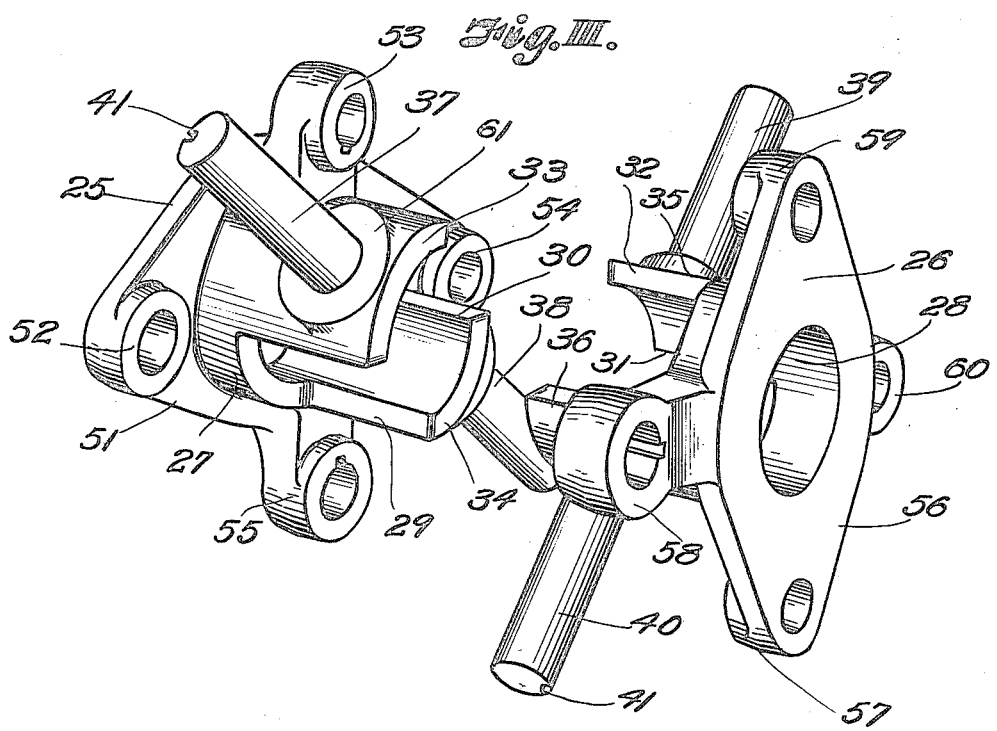
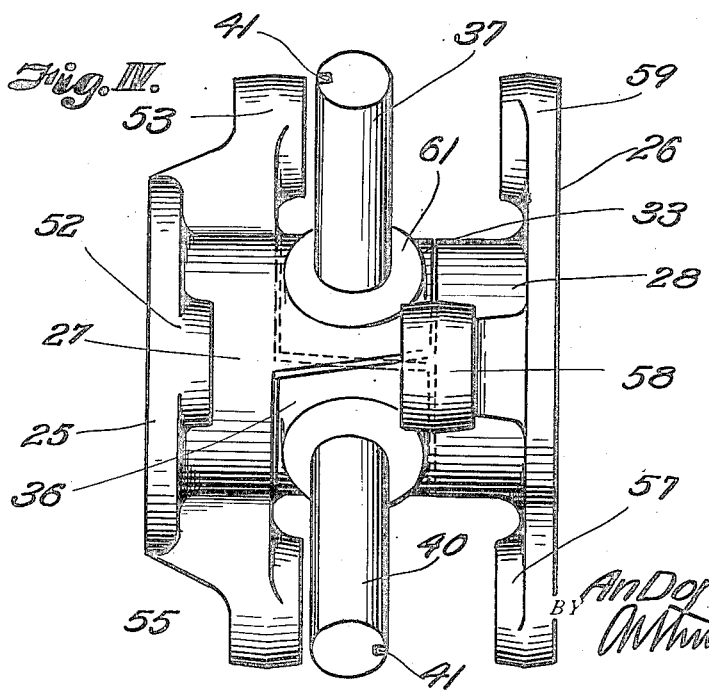
INVENTOR
BY Andor T. Nogrady
Arthur C. Brown
ATTORNEY.

UNITED STATES PATENT OFFICE.

ANDOR T. NOGRADY, OF WICHITA, KANSAS.

DIFFERENTIAL GEARING.

1,404,791.    Specification of Letters Patent.    Patented Jan. 31, 1922.

Application filed January 31, 1919. Serial No. 274,257.

*To all whom it may concern:*

Be it known that I, ANDOR T. NOGRADY, a citizen of the United States, residing at Wichita, in the county of Sedgwick and State of Kansas, have invented certain new and useful Improvements in Differential Gearing; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to locking differential gearing and more particularly to a mechanism to be placed upon the axle parts of a motor driven vehicle whereby the driving power may be applied through the axle or axle members to the ground wheels and whereby variation in speed of the respective driven wheels of the vehicle is permitted when deviating from a straight course, the construction being such that when either wheel loses traction, the thrust within the gearing effects a lock of the axle members so that the same are driven as a unit. In the event, however, that one wheel is relatively retarded and the other is relatively advanced, as in the case when differentiating, the lock of the gears is released by reversing the thrusts. In the preferred construction hereinafter described, the locking thrust is not only reversed but is balanced due to the continuous intermeshing train, thus permitting free differentiation.

One of the objects of the invention is to provide a differential gearing, particularly of the locking type in which the maximum amount of leverage between the gear elements may be provided with the minimum apparent tooth pressure and at the same time, provide an efficient tooth contact for the transmission elements of the differential gearing.

The invention consists broadly in providing a locking differential gearing including a driving member, two driven members having gears with inwardly projecting teeth, and sets of intermeshing gears mounted so that gears of one set engage the inwardly projecting teeth on one of the driven members, and gears of another set engage the inwardly projecting teeth of the other driven member, and other intermediate gears to connect the sets; or, separate connecting sets may be used wherein certain gear or gears of each set engage the inwardly projecting teeth of one driven member and other gears of each set engage the inwardly projecting teeth of the other driven member.

The preferred embodiment of my invention is referred to in the following detailed description.

Fig. I is a vertical sectional view of a gearing constructed in accordance with my invention on the line I—I of Figure II.

Fig. II is a sectional view on the line II—II of Figure I.

Fig. III is a disassociated view of the differential collar or gear-supporting spider members.

Fig. IV is an elevational view of the same in their co-operative positions, and

Fig. V is a fragmentary detail view of the collar or spider-supporting rings showing one of the spindle sleeves or sockets.

The differential is illustrated as consisting of a housing comprising the two end members 1 and 2 provided with axle-receiving sleeves 3 and 4, the end members 1 and 2 being also constructed with annular inwardly projecting flanges 5 and 6 spaced apart by a pair of spider-supporting rings 7 and 8, the whole being connected by bolts 9. The ring sections 7 and 8 are each provided with a plurality of semi-tubular spindle-receiving sockets or seats 10 and 11 which, when the rings are brought together, as shown in Figure I, will constitute inwardly disposed sockets for the reception of the spindles on the spider, to be referred to hereinafter. The spindle-receiving sockets are designated in Figure II by the numerals 12, 13, 14 and 15 respectively, these being disposed equal distances apart at about 90° of the circle, the sockets being provided with fillets 16 and 17, as best seen in Figures II and V. Within the casing and aligning with the axle-receiving sleeves 3 and 4 are a pair of differential gearing members 17 and 18. Each member comprises a tubular portion 19 having ribs or keys 20 extending longitudinally on the inner wall thereof to engage grooves in the axle members whereby rotative movement of either of the members 17 or 18 will impart corresponding rotative movement to the axles and vice versa.

The web portion 21 of each differential gear member extends toward the periphery of the differential housing and carries an inwardly projecting flange 22 on which are inwardly disposed helical teeth, the teeth in Figure I being designated 23 and 24 respectively. Therefore, it will be seen that each axle-receiving member carries a gear with inwardly projecting teeth and as the teeth project inwardly from the perimeter of the respective members 17 and 18, the maximum leverage will be provided.

Sleeved upon the axle-receiving tubular portions 19 of the differential gears are the complementary members 25 and 26 of a sectional spider or collar which carry the spindles to support the differential pinions as well as the locking gears. The collar sections 27 and 28 are provided with pairs of diametrically opposite slots 29 and 30 and 31 and 32 respectively, forming tongues 33 and 34 to be received by the slots 31 and 32, and tongues 35 and 36 to be received by the slots 29 and 30 so that the two complementary members may be assembled in locking relation with a tongue and slot disposed equi-distantly about the axis of the housing.

Projecting radially from the tongues of the complementary members are spindles 37 and 38 on the member 25, and 39 and 40 on the member 26, so that when the two spider sections are assembled, a radially disposed spindle will be locked at each 90° of the circle and each spindle is provided with a groove or key-way 41 to receive a locking key of a thrust washer, which will be described hereinafter. When the spider or collar is assembled in proper operative relation, as indicated in Figures I and IV, each carries a locking gear 42, 43, 44 and 45 respectively (see Fig. II) provided with helical teeth adapted to mesh with the helical teeth on the pinions 46, 47, 48 and 49 respectively, also carried on shafts 50 in bearings on the complementary members 25 and 26. The member 25 is provided with a lozenge-shaped head 51 provided with bearings 52, 53, 54 and 55, those designated 53 and 55 being in-set with respect to the bearings 52 and 54, and the member 26 is also provided with a lozenge-shaped head 56 which likewise is provided with bearings 57, 58, 59 and 60, the bearings 58 and 60 being in-set with respect to those designated 57 and 59. The in-set bearings on one head alternating with those on the other head by registering with the flush bearings on the opposite head, as will be apparent by reference to Figures III and IV. The bearings 53, 55, 58 and 60 have key-ways to receive the locking pins for the respective shafts on which the pinions rotate.

It will be apparent from the foregoing description that two diametrically opposite pinions will be in mesh with the teeth 23 and two other diametrically opposite pinions will be in mesh with the teeth 24. Therefore, two pinions will be effective in driving one axle gear while the other set will be common to the other axle gear.

As heretofore explained, each spindle will carry a locking gear in mesh with its complementary pinion and each gear will rest upon a bearing seat 61 on one of the parts 27 or 28 and be held against end thrusts by a washer 62 keyed at 63 in one of the key-ways 41 and bearing against the inner end of the seat or tube carried by the ring members 7 and 8 to reduce wear and provide proper oiling facilities under locking conditions. Suitable oiling ports may be disposed throughout the gears and the casing wherever desired as, for example, the oiling ports 64, 65 and 66 (see Fig. I).

67 designates a master gear carried by the housing which is also provided with a supplemental master gear 68 of less circumference so that the changed speed may be effected at the differential.

From the foregoing it will be apparent that the housing with its master gear constitutes the driving part of the gearing and that as the housing rotates it will carry with it the rings and the spider on which are mounted the locking gears and pinions. The pinions will communicate motion to the differential gearing members 17 and 18 and rotate the axle members so that when the vehicle is moving in a straight line, both axles will be driven at the same speed. As the spindles on the spider or collar have fixed relation to the master gear, motion will be imparted to the entire set of gears to impart motion to the driven members 17 and 18 in a manner well understood.

If the vehicle carrying the differential encounters a soft spot in the road, grass land or other slippery surfaces, the locking gears will exert sufficient thrust to induce a locking effect that retards or completely stops the tendency of a rotary movement so that all the gear wheels drag on the locking gear wheels and the driving force is exerted from the master gear on the retarded ground wheel as well as on the free wheel, so that both axle members will be driven.

The construction is such that not only is the mechanism easily assembled and taken apart but objectionable thrusts are avoided, the embodiment herewith presented affording the maximum leverage between the driving member or housing and the driven members 17 and 18, it also being an important feature in this invention that a maximum tooth contact is provided between all of the gears and at the same time a minimum pressure is exerted upon the teeth of the gears.

Having thus described my invention, what I claim as new therein, and desire to secure by Letters-Patent is:

1. In a locking differential, a driving member, two driven members having inwardly projecting teeth, sets of intermeshing gears mounted so that the gears of one set engage the inwardly projecting teeth of one of the driven members and the gears of another set engage the inwardly projecting teeth of the other member and intermediate gears to connect the sets.

2. In a locking differential, a driving member, two driven members having inwardly projecting teeth extending from their peripheries, and sets of intermeshing gears having movement imparted thereto by the driving member and mounted so that gears of one set engage the inwardly projecting teeth of one of the driven members and gears of the other set engage the inwardly projecting teeth of the other driven member, and intermediate gears meshing with certain gears of each set to perform a differential function.

3. In a locking differential, a driving member, a pair of aligned axle-receiving members, each having a gear provided with inwardly projecting teeth, a set of parallel gears mounted in the driving member and engaging one of the axle-receiving member gears, a second set of parallel gears also mounted in the driving member and engaging the other axle-receiving member gears, a set of locking gears mounted in the driving member and so disposed as to connect all of the parallel gears in one continuous train to balance the thrust on each individual gear in the train when differentiating.

4. In a locking differential, a driving member, two driven members comprising axle-receiving sleeves having laterally-extending webs provided with peripherial flanges disposed one toward the other with inwardly projecting teeth on the flanges, a spider carried by the driving member, pinions carried by the spider, alternate pinions alternately engaging the teeth on the driven members, and locking gears on the spider between the pinions to connect all of the pinions in a continuous train.

5. In a locking differential, a driving member, two driven members within the driving member and comprising axle-receiving sleeves and provided with peripherial flanges having inwardly projecting teeth, the flanges being spaced from but connected to the sleeves, parallel pinions carried by the driving member and engaging the teeth on the respective driven members, and locking gears interposed between and engaging the pinions.

6. In a locking differential, a driving member comprising a cylindrical housing, a spider carried by said housing consisting of two inter-locking sleeve members carrying spindles which engage the driving member, axle-receiving members upon which the sleeved portions of the spider fit, flanges concentric with the axes of the axle-receiving members having inwardly projecting teeth, said flanges being connected to the axle-receiving portions in spaced relation thereto, parallel pinions carried by the spider, alternate pinions engaging alternate toothed flanges, and locking gears on the spindles engaging the pinions.

In testimony whereof I affix my signature.

ANDOR T. NOGRADY.